United States Patent [19]

Merle

[11] 3,889,815

[45] June 17, 1975

[54] LENS TRAY

[76] Inventor: Joseph Merle, 8101 Crespi Blvd., Miami Beach, Fla. 33141

[22] Filed: July 27, 1973

[21] Appl. No.: 383,345

[52] U.S. Cl. .................................. 211/41; 206/454
[51] Int. Cl. ............................................. A47f 7/00
[58] Field of Search ........ 211/41, 40, 170; 206/449, 206/454, 72

[56] References Cited
UNITED STATES PATENTS

| 2,443,404 | 6/1948 | Tallarico | 211/41 |
| 3,486,631 | 12/1969 | Rodman | 211/41 |
| 3,682,083 | 8/1972 | Puente | 211/41 |

*Primary Examiner*—Roy D. Frazier
*Assistant Examiner*—Robert W. Gibson, Jr.

[57] ABSTRACT

A lens holding tray with a pair of parallel rows of adjustable three point contact seats, the seat of each row being adapted to hold a separate lens in spaced relation from the other lenses in the row. The tray includes: 1) a frame, which defines two rows which are parallel, and included in each row are two fixed contact points for the seats of each row, and 2) an outboard, swingable, U-shaped member on each side of the frame, the base of each U-shaped member defining the third contact for the seats of one of the rows. Along each of the rod members cradle means are provided to define two rows of lens holding seats.

5 Claims, 6 Drawing Figures

LENS TRAY

FIELD OF THE INVENTION

This invention relates to a lens holding-tray having adjustable seats to accommodate various size lenses.

BACKGROUND OF THE INVENTION

In the manufacture of lenses, it is often necessary to transport a plurality of lenses from one station to another. Because lenses are relatively delicate, especially plastic lenses, and are irregularly shaped, being concave or convex, if a group of lenses are transported from one station to another the lenses must be maintained in spaced-apart relation so that they do not become damaged by scratching. This invention provides a lens-holding tray which provides separate seats for carrying a plurality of such lenses, each nested in a separate seat in spaced-apart relation from adjacent lenses. The size of the seats of the tray are adjustable to accommodate various lenses of various diameters and also to accommodate lenses of various thickness.

OBJECTS OF THE INVENTION

The seats of the tray of the instant invention are three point contact seats for the lenses which are generally circular; and it is an object of this invention to provide a lens-holding tray having a plurality of adjustable three-point contact seats for various size diameter lenses; and it is a further object of this invention to provide a tray holder of the type described which, in addition to adjustable diameter seats, provides convenient means to vary the axial dimension of the seats for lenses of various thicknesses.

It is a more particular object of this invention to provide a lens-holding tray which includes: 1) a frame defining two rows which are parallel and included in each row are two fixed contact points for the seats of each row, and 2) a swingable, U-shaped member on each side of the frame, the base of each U-shaped member defining a third contact for the seats of one of the rows; and in which the frame includes: a) a pair of spaced, inverted, T-shaped end members, b) a central rod member interconnecting the end members and c) a side rod member on each side of the central rod member, each side rod member spanning the end members and being parallel to and spaced outboard of the central rod member. Each of the swingable U-shaped members includes a base defined by a rod member parallel to the other rod members and each U-shaped member is pivotally connected to the frame through its legs for swinging movement about the adjacent side rod member, the swingable side rod member defining an adjustable third contact point for the seats of each row.

It is a general object of this invention to provide an improved lens-holding tray which is simple and inexpensive to manufacture, is adjustable in size to accommodate lenses of various diameters and various thicknesses.

In accordance with these and other objects which will become apparent hereinafter, the instant invention will now be described with reference to the accompanying drawings.

DESCRIPTION OF A PREFERRED EMBODIMENT

Figure 1:
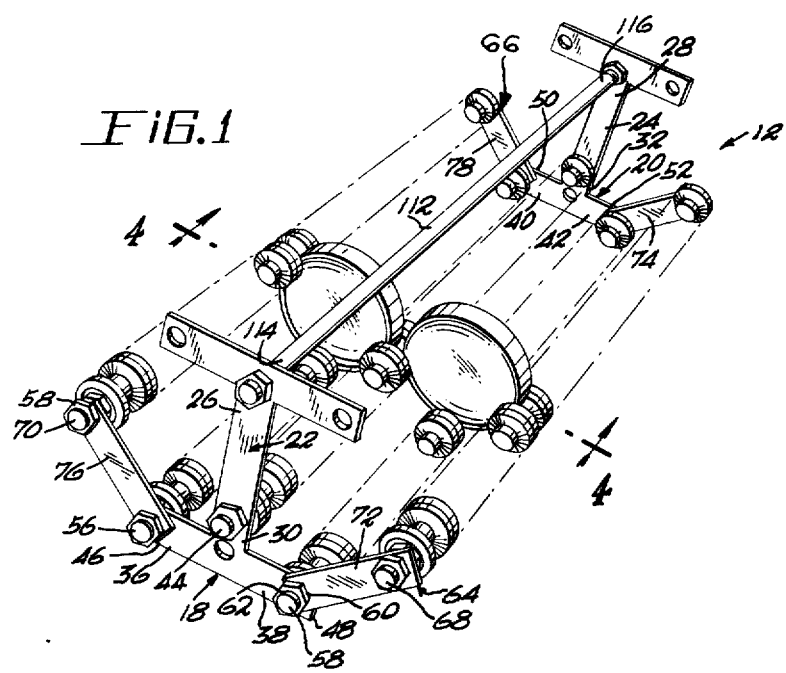
FIG. 1 is a perspective view of a lens holder constructed in accordance with the instant invention.

Referring to the drawings wherein like reference characters designate like or corresponding parts throughout the several views, and referring particularly to FIG. 1, the lens holder is generally designated by the numeral 12 and comprises a pair of matching, generally inverted T-shaped end members 18 and 20 which are spanned by a plurality of parallel, elongate, cradle-carrying members which are adjustable to accommodate various size lenses to be held between the elongate members in three point contact seats or cradles, the size of which are adjustable.

With more particularity, the tray comprises a frame with matching first and second end members 18 and 20 which are generally of inverted T-shape and are arranged in spaced, confronting relation. Each end member includes a) a standard or stem portion 22 and 24 having an upper and a lower end zone 26 and 28 and 30 and 32, and b) a cross bar portion defining a pair of oppositely diverging arm portions, the arm portions being designated by the numerals 36 and 38 on end member 18, and 40 and 42 on end member 20. A central elongate member 44, which is preferably circular in cross section, connects the lower end zone of the stems of the end members, i.e., the standard portions are connected adjacent the juncture of the cross bar and the stem of the end members.

Connecting the cross bar terminal end zones 46 and 48 and 50 and 52, that is, the distal arm portions, elongate side rod members 56 and 58 are provided so that there is a rod on each side of the central elongate member. The elongate side rod members it is seen are parallel to the central elongate member with one being on each side thereof, and the centerline of each side rod member is in the common lateral plane preferably beneath the centerline of the central elongate member. Suitable means are provided to connect the opposite ends of each of the rod members to the end members, such as that indicated by the nut 60 on the threaded end 62 of the rod or elongate side rod member 58. It is thus seen that corresponding points in the same plane along the rod members define lateral planes and two points of contact of the seat for lenses, the third point of contact for the seats being provided as follows:

A first and a second generally U-shaped member, which are indicated by the numerals 64 and 66, are provided and connected for swinging movement to the tray. Each U-shaped member includes a base composed of an elongate rod member 68 and 70 and a pair of legs 72 and 74, and 76 and 78. Each of the U-shaped members is swingably connected to the arms of the opposite end members in the preferred embodiment for pivotal movement of the rod members or base of the U-shaped members about the adjacent side rod members. The base portions of the U-shaped members are parallel to the central elongate member, and the legs of each U-shaped member are of a common length in the illustrated embodiment. Pivot means are provided to connect the terminal ends of the legs of each U-shaped member to the terminal end zones of the arm portions of the end pieces on opposite sides of the standard portion, whereby the U-shaped members are swingable about the first and second elongate members respectively, with the base portion of said U-shaped members at all times parallel to said central and first and second elongate members. Lock means are provided to hold the U-shaped members in a predetermined pivotal position with respect to the connected arm portions and may comprise the nut means 58 previously described.

Figure 2:
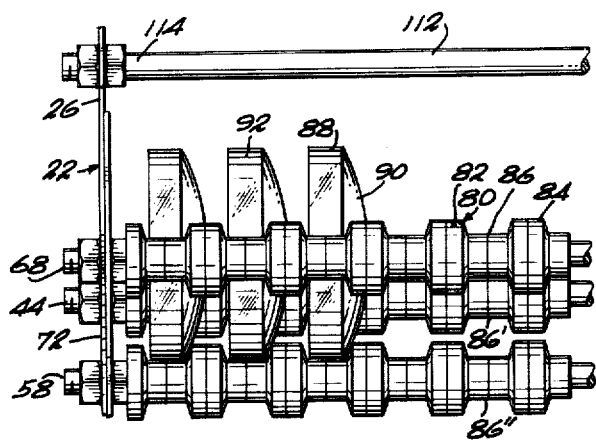
FIG. 2 is a partial side elevation view of the lens holder shown in FIG. 1.

Seat means are provided along said elongate members and the bases of said U-shaped members to define a row of three point contact seats on each side of said standard portion. The seat means in the preferred embodiment illustrated comprise a plurality of abutting, similarly sized spools, such as shown in FIG. 2, in which the spools are designated by the numeral 80. Each spool includes flanged or enlarged ends 82 and 84 of a common diameter. The space between the enlarged ends defines a nest 86. It is thus seen that the seats 86, 86' and 86'' of opposite spools of the central elongate members, side elongate members and base define a three point contact for holding a lens such as that designated by the numeral 88. Such lens ordinarily have an annular portion and a concave or convex portion such as that designated by the numeral 90. By reason of the flange portion of the spool the lens surface is held away from adjacent lens such as that designated by the numeral 92.

Figure 3:
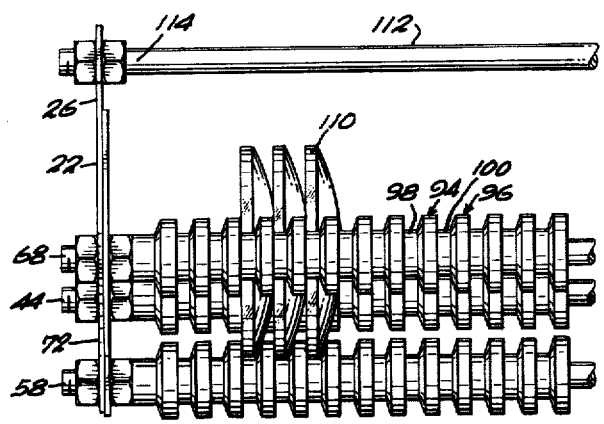
FIG. 3 is a view similar to FIG. 2 and illustrating a smaller seat for the lens than that of the size of the seat shown in FIG. 2.
Figure 4:
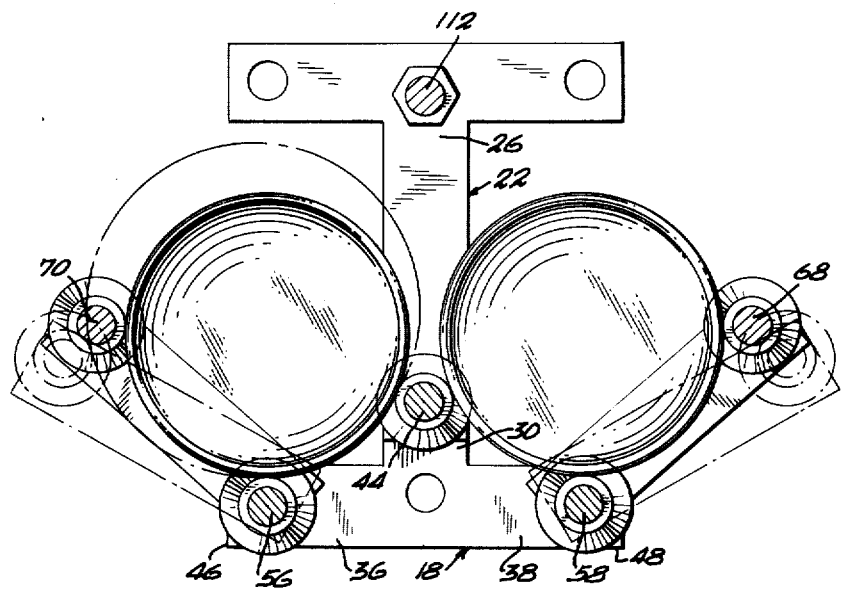
FIG. 4 is a view in cross section of the lens holder shown in FIG. 1 and taken along the plane indicated by the line 4—4 and looking in the direction of the arrows.
Figure 5:
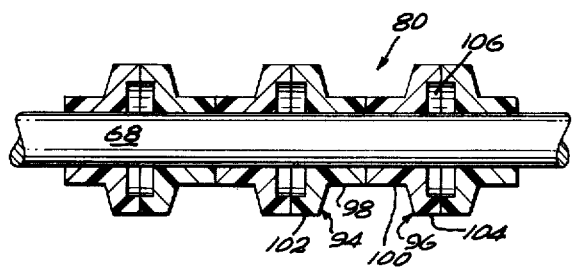
FIG. 5 is an enlarged view of a portion of FIG. 2 illustrating the cradle means or seats for the lenses.
Figure 6:
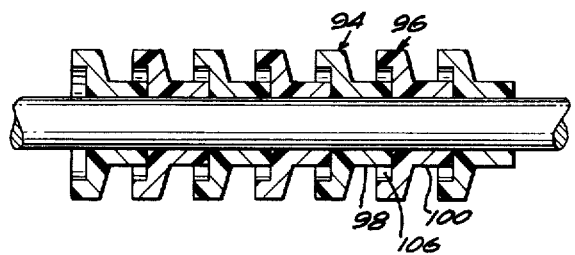
FIG. 6 is a partial view of FIG. 3 illustrating the construction of the cradle means.

Alternatively and with reference to FIG. 5, the spool 80 may include a pair of segments 94 and 96 each of which includes a tubular portion 98 and 100 with the terminal ends in abutting relation and an enlarged tubular portion 102 and 104 for abutting engagement with adjacent similarly constructed segments and with the enlarged tubular portion having a recessed portion such as that designated by the numeral 106 which is a diameter greater than that of the tubular portion 100 or 98, so that the tubular portion is adapted to be receivable within the recess to define smaller seats as shown in FIG. 3 and FIG. 6 to accommodate lens such as that designated by the numeral 110 having a smaller annular portion.

Preferably, the tray is provided with handle means 112 for carrying the tray, a suitable handle means comprising an elongate rod having its opposite ends 114 and 116 connected to the upper end zone of the end members; and, there may be provided downardly depending U-shaped members, not shown, similar to the previously described U-shaped member to serve as keepers for keeping the lenses in the three point contact seats when being transported so as not to be jostled.

What is claimed is:

1. An adjustable lens holder tray comprising:

A. a frame including, a matching first and second end member in spaced confronting relation, each end member including a standard portion having an upper and a lower end zone, and a pair of arm portions adjacent said lower end extending laterally and oppositely from said standard portion,
B. a central elongate member extending between said end members and connecting the lower end zones of each standard portion,
C. a first elongate side member parallel to said central elongate member connecting the opposing arm portions of the first and second end members on one side of said standard portions,
D. a second elongate side member parallel to said central elongate member connecting the opposing arm portions of the first and second end members on the other side of said standard portions,
E. means to connect said elongate members to said end members,
F. a first and a second generally U-shaped member, each having a base comprising an elongate member parallel to said central elongate member and each having a pair of legs of common length,
G. pivot means connecting the terminal end of the legs of said first U-shaped member to the end members on one side of said standard portion,
H. pivot means connecting the terminal ends of the legs of said second U-shaped member to the end members on the other side of said standard portion,
I. said U-shaped members being swingable about the first and second elongate members respectively with the base portion of said U-shaped members at all times parallel to said central elongate member,
J. said elongate members and said base of each of said U-shaped members comprising a plurality of separate spaced, three point contact seats on opposite sides of said standard portion for seating circular objects,
K. said U-shaped members comprising adjustment means for adjusting the size of the seats on swinging movement of said U-shaped members.

2. The device as set forth in claim 1 wherein lock means are provided for keeping the adjustment means in a predetermined locked position.

3. The device as set forth in claim 1 wherein cradle defining means of common size are provided on each elongate member.

4. The device as set forth in claim 3 wherein said cradle defining means comprise a plurality of similarly sized spools arranged along said elongate members and base portions, each spool having a central recessed portion sized to nest the edge of a lens therein.

5. The device as set forth in claim 4 wherein each of said spools comprises a first and a second segment, each segment having a tubular portion of a first diameter and an enlarged tubular portion, said enlarged tubular portion having a recessed diameter less than that of said first tubular portion.

* * * * *